Patented Dec. 4, 1945

2,390,113

UNITED STATES PATENT OFFICE 2,390,113

MONOAZO COMPOUNDS

James G. McNally and Joseph B. Dickey, Rochester, N. Y., assignors to Eastman Kodak Company, Rochester, N. Y., a corporation of New Jersey No Drawing. Application August 4, 1941,
Serial No. 405,374

4 Claims. (Cl. 260—198)

This invention relates to new azo compounds and their application to the art of dyeing or coloring. Textile materials such as organic derivatives of cellulose, wool, silk, nylon and "Vinyon" and lacquers composed of cellulose esters, cellulose ethers and vinyl derivatives, for example, can be colored. Coloration can be effected by dyeing, printing, stenciling or other suitable methods.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned as well as the other materials named herein.

It is an object of our invention to provide a new class of azo compounds. Another object of our invention is to provide a process for the coloration of organic derivative of cellulose, wool, silk, nylon and "Vinyon" textile materials. A further object is to provide colored textile materials which are of good fastness to light and washing. A specific object is to provide greenish-blue cellulose acetate textile materials which are readily dischargeable to a clear white by zinc formaldehyde sulfoxalate or sodium formaldehyde sulfoxalate.

The azo compounds of our invention by means of which the above objects are accomplished or made possible consist of the azo compounds having the formula:

$$R-N=N-R_1$$

wherein R represents the residue of a benzene nucleus containing a nitro group in para position and a sulfonamide group in ortho position to the azo bond and $R_1$ represents the residue of a naphthalene nucleus containing an alkylamino group in para position to the azo bond.

While our invention relates broadly to the azo compounds having the above formula, it relates more particularly to the azo compounds having the formula:

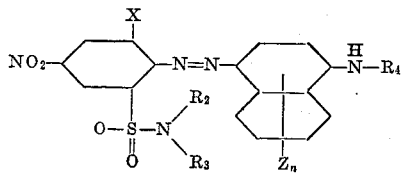

wherein $R_2$ and $R_3$ each represents a member selected from the group consisting of an alkyl group and a phenyl group and $R_3$ may be in addition hydrogen, X represents a member selected from the group consisting of hydrogen, a halogen atom, a nitro group, a hydroxy group, an alkylsulfone group, an alkylketone group, an alkyl group, a carboxyl group, a COO-alkyl group and a

group, wherein $R_2$ and $R_3$ have the meaning above given, $R_4$ represents an alkyl group, Z represents a member selected from the group consisting of a hydroxy group, an alkoxy group, an amino group, a halogen atom, a trifluoroalkyl group, an acylamino group and an alkyl group and $n$ represents a member selected from the group consisting of 0, 1, 2 and 3.

Compounds wherein the member X is hydrogen or a nitro group, the member Z is a hydroxy group, the member $R_2$ is alkyl and the member $R_3$ is hydrogen or alkyl are, as a general rule, advantageous. Normally, when $R_2$ and $R_3$ are alkyl, they represent an unsubstituted alkyl group such as methyl, ethyl, propyl, butyl or amyl, a hydroxyalkyl group such as β-hydroxyethyl, β-hydroxypropyl or γ-hydroxypropyl and an alkoxyalkyl group such as β-methoxyethyl or β-ethoxyethyl. The alkyl group represented by $R_4$ includes unsubstituted as well as substituted alkyl groups as illustrated hereinafter. However, normally $R_4$ is an alkyl group such as has been defined in connection with the members $R_2$ and $R_3$.

The azo compounds of our invention constitute valuable dyes for the coloration of the materials hereinbefore named, especially for the coloration of cellulose acetate and nylon. For the coloration of organic derivative of cellulose textile materials, nuclear non-sulfonated compounds should be employed and it is to such compounds that our invention is more particularly directed. These compounds likewise can be used to color the other materials named herein. Nuclear sulfonated compounds of the invention, which can be prepared by sulfonation of the unsulfonated compounds, possess little or no utility for the coloration of organic derivative of cellulose textile materials but can be used to color wool and silk.

The dye compounds of our invention yield blue-green, greenish-blue, blue, and violet shades. Generally speaking, the colorations on cellulose acetate silk possess good light fastness properties in comparison with other azo dyes yielding comparable shades on this material. Further, we have noted that the azo compounds prepared by coupling the diazonium derivatives of 2-amino-5-nitrobenzene sulfone alkylamide and 2-amino-3,5-di-nitrobenzene sulfone alkylamide with 1- hydroxyalkylamino-5-naphthol yield greenish-blue shades on cellulose ester and ether fabrics which are readily dischargeable to a clear white by the reducing agents named hereinbefore.

The azo compounds of our invention can be prepared by diazotizing the 2-amino-5-nitrobenzene sulfonamide compounds described herein and coupling the diazonium compounds obtained with an α-alkylaminonaphthalene coupling compound which couples with the alkylamino group in para position to the azo bond.

The following examples illustrate the preparation of the azo compounds of our invention:

Example 1

1 gram mole of 2-amino-5-nitrobenzenesulfone-β-hydroxy-ethylamide is diazotized in nitrosyl sulfuric acid, poured into water, filtered, and the recovered precipitate is washed free of mineral acid and nitrous acid. The crystalline diazonium compound thus prepared is added to a cold acetic acid solution of 1 gram mole of 1-β,γ-dihydroxypropylamino - 5 - hydroxynaphthalene. Upon completion of the coupling reaction which takes place, the reaction mixture is poured into ice and water and the dye compound formed is recovered by filtration, washed with water and dried. The dye compound obtained colors cellulose acetate silk, and the other materials named herein greenish-blue shades of good light fastness and excellent dischargeability.

1 gram mole of 2-amino-5-nitrobenzenesulfone-β-methoxyethylamide can be substituted for the 2-amino-5-nitrobenzene sulfone-β-hydroxyethylamide of the example to obtain a dye of equal value and which has the same properties as the dye of the example.

Example 2

1 gram mole of 2-amino-3,5-dinitrobenzenesulfone-β-hydroxyethylamide is diazotized and the diazonium compound obtained is coupled with 1 gram mole of 1-β,γ-dihydroxypropylamino-5-hydroxynaphthalene. Diazotization, coupling and recovery of the dye compound formed can be carried out in accordance with the procedure described in Example 1. The dye compound obtained colors cellulose esters and ethers blue-green shades of good light fastness and excellent dischargeability.

Example 3

1 gram mole of 2-amino-5-nitrobenzenesulfone ethylamide is diazotized in acetic acid by means of nitrosyl sulfuric acid. The diazonium solution obtained is added to an iced acetic acid solution of 1-β-hydroxyethylamino-5-naphthol. The coupling reaction which takes place is completed by adding sodium acetate following which the dye compound formed is precipitated by adding water and recovered by filtration. The precipitated dye is washed with water and dried. It colors cellulose acetate silk greenish-blue shades.

Example 4

1 gram mole of 2-amino-3,5-dinitrobenzenesulfone ethylamide is diazotized as described in Examples 1 and 3 and the diazonium mixture resulting is poured into water. The diazonium compound that separates is filtered, washed with water and dissolved in acetic acid. The diazo solution thus prepared is then added to a cooled acetic acid solution of 1-β-hydroxyethylamino-7-hydroxynaphthalene. Coupling and recovery of the dye compound can be carried out in accordance with the procedure described in Example 3. The dye compound obtained colors cellulose acetate and the other materials named herein bluish-green shades.

1 gram mole of β,γ-dihydroxypropylamino-α-naphthalene can be substituted for the coupling component of the example to obtain a dye compound which colors the materials named herein blue.

Example 5

1 gram mole of 2-amino-3,5-dinitrobenzenesulfone butylamide is diazotized and the diazonium compound obtained is coupled with 1 gram mole of 1-β-sulfoethylaminonaphthalene. The dye compound obtained colors cellulose esters and the other materials named herein greenish-blue shades.

Example 6

1 gram mole of 2-amino-3,5-dinitrobenzene sulfone di-β-methoxyethylamide is diazotized and the diazonium compound obtained is coupled with 1 gram mole of 1-β-sulfato ethylamino-5-acetamino-naphthalene. Coupling and recovery of the dye compound formed can be carried out in accordance with the procedure described in previous examples. The dye compound obtained yields bluish-green colorations.

1 gram mole of 1-β,γ-dihydroxypropylaminonaphthalene or 1-γ-hydroxypropylaminonaphthalene can be substituted for the coupling component of the example to obtain dyes which yield blue colorations.

Example 7

1 gram mole of 2-amino-5-nitrobenzenesulfone dimethylamide is diazotized and the diazonium compound obtained is coupled with 1 gram mole of 1-β,γ-dihydroxypropylaminonaphthalene. The dye compound obtains colors cellulose acetate silk and the other materials named herein greenish-blue.

1 gram mole of 2-amino-3,5-dinitrobenzenesulfone dimethylamide can be diazotized and substituted for the diazonium compound of the example to obtain a dye compound which yields shades on the materials named herein bluish-green.

Example 8

1 gram mole of 2-amino-5-nitrobenzenesulfone methyl laurylamide is diazotized and the diazonium compound obtained is coupled with 1 gram mole of 1-β-sulfoethylamino-5-hydroxynaphthalene. The dye compound obtained yields greenish-blue shades.

Example 9

1 gram mole of diazotized 2-amino-5-nitrobenzenesulfone-β-hydroxyethylamide is coupled with 1 gram mole of 1-β-hydroxyethylamino-6,8-dichloro-5-hydroxynaphthalene. The dye compound obtained colors cellulose esters and the other materials named herein greenish-blue shades.

Example 10

1 gram mole of diazotized 2-amino-3-hydroxy-5-nitrobenzenesulfone phenylamide is coupled with 1 gram mole of 1-β-hydroxyethylamino-8-methoxynaphthalene. The dye compound obtained yields violet colorations on the textile materials named herein.

Example 11

1 gram mole of diazotized 2-amino-3,5-dinitrobenzenesulfone methylamide is coupled with 1 gram mole of 1-methylamino-5-hydroxy-8-acetaminonaphthalene. The dye compound obtained yields green shades on the materials named herein.

*Example 12*

1 gram mole of diazotized 2-amino-5-nitrobenzene-sulfonamide is coupled with 1 gram mole of 1 - β,γ-dihydroxypropyl-aminonaphthalene. The dye combound obtained gives violet shades on the textile materials named herein.

*Example 13*

1 gram mole of diazotized 2-amino-3,5-dinitrobenzene-sulfonamide is coupled with 1 gram mole of 1 - β,γ - dihydroxypropyl - aminonaphthalene. The dye compound obtained colors the textile materials named herein greenish-blue shades.

The following tabulation further illustrates the compounds included within the scope of our invention together with the color they produce on the textile materials named herein. The compounds indicated below may be prepared by diazotizing the amines listed under the heading "Amine" and coupling the diazonium compounds obtained with the compounds in the column entitled "Coupling Component." The diazotization and coupling reactions may, for example, be carried out following the general procedure described in Examples 1 to 15, inclusive.

| | Amine | Coupling component | Color |
|---|---|---|---|
| 1 | 2-amino-5-nitrobenzenesulfonethylamide | 1-β-hydroxyethylamino-5-hydroxynaphthalene | Green-blue. |
| 2 | 2-amino-5-nitrobenzenesulfone-β-hydroxyethylamide | do | Do. |
| 3 | 2-amino-5-nitrobenzenesulfone-β-methoxyethylamide | do | Do. |
| 4 | 2-amino-5-nitrobenzenesulfonedimethylamide | do | Do. |
| 5 | 2-amino-5-nitrobenzenesulfone phenylamide | do | Do. |
| 6 | 2-amino-3-chloro-5-nitrobenzene-sulfone-β-sulfoethylamide. | do | Do. |
| 7 | 2-amino-3-methyl-5-nitrobenzenesulfone butylamide | do | |
| 8 | 2-amino-3-methyl-keto-5-nitrobenzene sulfonethylamide | do | Do. |
| 9 | 2-amino-3-methylsulfone-5-nitrobenzene sulfonethylamide. | do | Do. |
| 10 | 2-amino-3-sulfonethylamide-5-nitrobenzene sulfonethylamide. | do | Do. |
| 11 | 2-amino-3,5-dinitrobenzene sulfonethylamide | do | Do. |
| 12 | 2-amino-3,5-dinitrobenzene sulfone propylamide | do | Blue-green. |
| 13 | 2-amino-3,5-dinitrobenzene sulfone β-hydroxyethylamide. | do | Do. |
| 14 | 2-amino-3,5-dinitrobenzene sulfone amylamide | do | Do. |
| 15 | 2-amino-3,5-dinitrobenzene sulfone β-methylethylamide. | do | Do. |
| 16 | 2-amino-3,5-dinitrobenzene sulfone dimethylamide | do | Do. |
| 17 | 2-amino-3,5-dinitrobenzene sulfone diethylamide | do | Do. |
| | 1-10 above | 1-β-hydroxypropylamino-7-hydroxynaphthalene | Green-blue. |
| | 11-17 above | do | Blue-green. |
| | 1-10 above | 1-β,γ-dihydroxypropylamino-6-hydroxynaphthalene | Green-blue. |
| | 11-17 above | do | Blue-green. |
| | 1-10 above | 1-β-sulfoethylamino-5-hydroxy-8-trifluoromethylnaphthalene. | Green-blue. |
| | 11-17 above | do | Blue-green. |
| | 1-10 above | 1-γ-sulfatopropylamino-5-hydroxy-6,8-dichloronapthalene. | Green-blue. |
| | 11-17 above | do | Blue-green. |
| | 1-10 above | 1-β,γ-dihydroxypropylaminonaphthalene | Violet. |
| | 11-17 above | do | Blue. |

The dye compound obtained yields blue shades on the materials named herein.

1 gram mole of 1-β-hydroxyethylamino-5-hydroxynaphthalene can be substituted for the coupling component of the example to obtain a dye which yields bluish-green colorations.

*Example 14*

1 gram mole of 2-amino-3,5-dinitrobenzenesulfone diethylamide is diazotized and the diazonium compound obtained is coupled with 1 gram mole of 1-β,γ-dihydroxypropylaminonaphthalene. The dye compound obtained yields blue shades.

1 gram mole of 1-β-hydroxyethylamino-5-hydroxynaphthalene can be substituted for the coupling component of the example to obtain a dye compound which yields bluish-green colorations.

*Example 15*

1 gram mole of 2-amino-5-nitrobenzenesulfone di-β-hydroxyethylamide is diazotized and the diazonium mixture is poured onto ice and acid present in the reaction mixture neutralized by the addition of sodium bicarbonate. The precipitated diazonium compound is recovered by filtration, dissolved in acetic acid and added to a cold acetic acid solution containing 1 gram mole of 1 - β-hydroxypropylamino-5-hydroxynaphthalene. Upon completion of the coupling reaction which takes place, the reaction mixture is poured into water and the dye compound formed is recovered by filtration, washed with water and dried.

It will be understood that the foregoing examples are intended to be illustrative and not limitative of our invention. Thus any of the diazonium compounds can be coupled with any of the coupling components to yield dye compounds of the invention. Further amine compounds that can be used include, for example, 2-amino-3-bromo-5-nitrobenzenesulfonethylamide, 2-amino-3 - ethyl-5-nitrobenzenesulfonethylamide, 2-amino-3-ethylketo-5-nitrobenzenesulfondimethylamide, 2-amino-3-carboxyl-5-nitrobenzenesulfon-β-hydroxyethylamide, 2-amino-3-COOCH$_3$-5-nitrobenzenesulfonethylamide, 2 - amino-3-propylsulfone-5-nitrobenzenesulfonethylamide and 2-amino-3 - sulfonethylamide - 5 - nitrobenzenesulfonphenylamide. Further coupling components that can be employed include, for example 1-γ-phosphitopropylaminonaphthalene, 1 - β-hydroxypropylamino-5 - hydroxynaphthalene, 1 - β,γ - dihydroxypropylamino-5-hydroxynaphthalene, 1 - β-hydroxy-β-ethoxyethylamino-7-hydroxynaphthalene, 1-β-methoxyethylamino-8-hydroxynaphthalene, 1-β-hydroxypropylamino-5-acetaminonaphthalene, 1-β-phosphatoethylamino - 5 - hydroxynaphthalene, 1-β,γ-dihydroxypropylamino-5-hydroxy-6-bromonaphthalene and

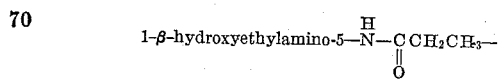

naphthalene.

In order that the preparation of the azo compounds of our invention may be entirely clear, the preparation of the components used in their manufacture is illustrated hereinafter.

Compounds having the formula:

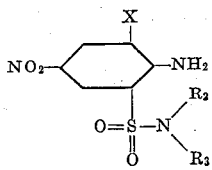

wherein $R_2$ stands for an alkyl group, $R_3$ stands for hydrogen or an alkyl group and X stands for a halogen atom, a nitro group, an alkyl group, an alkoxy group or a sulfonamide group can be prepared as described in our copending application, Serial No. 401,972, filed July 11, 1941.

Compounds having the formula:

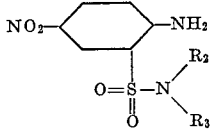

wherein $R_2$ and $R_3$ have the meaning just given can be prepared as indicated by the following series of equations.

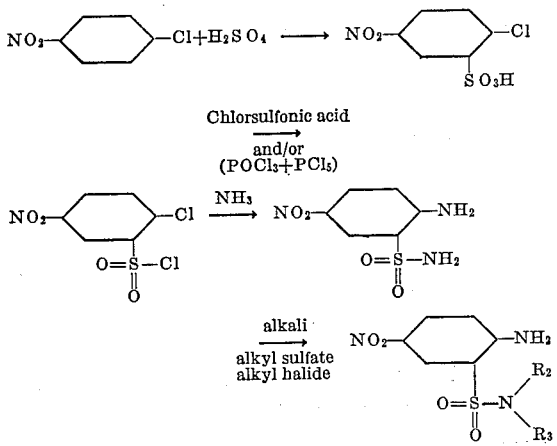

Similarly these compounds can also be prepared by the following indicated process steps.

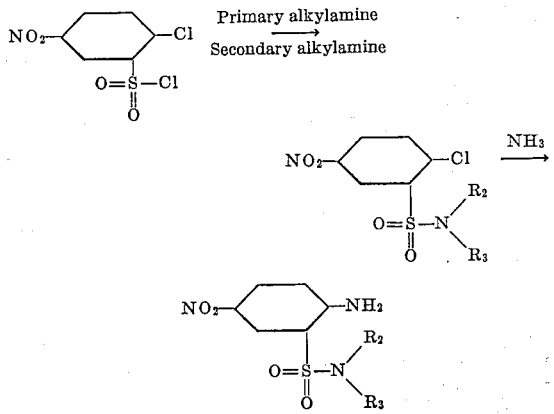

It will be understood that in the first series of equations the amount of alkylating agent used determines whether one or both of the hydrogen atoms of the sulfonamide group is replaced by an alkyl group. Similarly in the second series of equations the use of a primary alkylamine results in compounds wherein $R_3$ is hydrogen whereas if a secondary alkylamine is employed $R_3$ will be an alkyl group. By the use of a phenylating agent in place of an alkylating agent and a suitable primary or secondary aminobenzene in place of the primary or secondary alkylamines referred to above compounds wherein $R_2$ and $R_3$ are a phenyl nucleus can be obtained.

The following examples describe the preparation of specific illustrative components.

*Preparation of 2-amino-3-methylketone-5-nitrobenzene sulfonebutylamide*

1 gram mole of 2-chloro-5-nitrophenylmethylketone is sulfonated in 10% oleum at 60° C. When the reaction product is soluble in water, it is poured onto ice and the 2-chloro-3-sulfonic acid-5-nitrophenylmethylketone formed is obtained in its sodium salt form by salting out with sodium chloride. This compound is dried at 110° C. for 1 hour and then reacted with 6 gram molecular equivalent weights of chlorsulfonic acid. The reaction mixture resulting is poured into ice water and the precipitated 2-chloro-3-sulfochloride-5-nitrophenylmethylketone is recovered by filtration, dissolved in acetone and treated at 0° C. with 2 gram molecular equivalent weights of butylamine. The amide formed is precipitated by adding water and recovered by filtration. This amide product is aminated at 100° C. under pressure with 4 gram molecular equivalent weights of ammonia to obtain 2-amino-3-methylketone-5-nitrobenzenesulfonebutylamide the desired product.

*Preparation of 2-amino-3-methylsulfone-5-nitrobenzene sulfonethylamide*

The compound can be prepared by process steps indicated hereinafter. Sulfonate 2-chloro-5-nitrobenzenemethylsulfone, treat the product thus obtained with chlorsulfonic acid to obtain 2-chloro-3-sulfochloride-5-nitrobenzenemethylsulfone, react this compound with ethylamine to convert the sulfochloride group to the sulfonethylamide group and then react the amide compound with ammonia to obtain the desired product.

*Preparation of 2-amino-3-bromo-5-nitrobenzenesulfonethylamide*

1 gram mole of 2-amino-5-nitrobenzenesulfonethylamide is dissolved in acetic acid and 1 gram mole of bromine is added in the cold. After reaction is complete the desired product is obtained by pouring the reaction mixture into water and recovering the precipitate formed by filtering.

*Preparation of 2-amino-3-hydroxy-5-nitrobenzenesulfonephenylamide*

1 gram mole of 2-hydroxy-4-nitroaniline is sulfonated and the sulfonated compound formed is isolated in its sodium salt form. This compound is then heated with acetic anhydride and the product thus obtained is reacted with chlorsulfonic acid and the product of this reaction is in turn reacted with aniline to convert the sulfochloride group to the sulfonephenylamide group. The desired product can be obtained from this compound last formed by treatment with dilute sodium hydroxide.

*Preparation of 1-β-sulfoethylamino-8-trifluoromethyl-5-hydroxynaphthalene*

1 gram mole of 1-sodium-β-sulfoethylamino-8-trichloromethyl-5-hydroxynaphthalene is heated to 150–200° C. with 1.1 gram moles of antimony trifluoride. The resulting desired compound is purified by crystallization from water.

Preparation of 1-γ-sulfatopropylamino-5-hydroxy-6,8-dichloronaphthalene 1 gram mole of 1-γ-sulfatopropylamino-5-hydroxynaphthalene is dissolved in acetic acid and two gram moles of chlorine are bubbled in slowly while maintaining the reaction mixture in a cooled condition. The reaction mixture is poured into water, made neutral to Congo red paper with sodium acetate and the desired compound recovered by filtration and dried.

Preparation of 1-β-hydroxypropylamino-5-acetaminonaphthalene 1-amino-5-nitronaphthalene is reacted with acetic anhydride to form 1-acetamino-5-nitronaphthalene; this compound is then reduced with hydrogen in the presence of a finely divided nickel catalyst to obtain 1-amino-5-acetaminonaphthalene which, upon being reacted with propylene oxide yields the desired compound.

By starting with 1-amino-8-nitronaphthalene, 1 - β - hydroxypropylamino - 8 - acetaminonaphthalene can be similarly formed. As will be understood by the use of an agent other than propylene oxide, such as ethylene oxide, trimethylene oxide and glyceryl chlorhydrin the free amino group can be converted into a hydroxyalkylamino group other than the specific one chosen.

The azo compounds of our invention are, for the most part, relatively insoluble in water and, accordingly, they may be advantageously directly applied to the material undergoing coloration in the form of an aqueous suspension which can be prepared by grinding the dye to a paste in the presence of a sulfonated oil, soap or other suitable dispersing agent and dispersing the resulting paste in water. In some instances, the dye may possess sufficient solubility in water as to render the use of a dispersing agent unnecessary. Generally speaking, however, the use of a dispersing agent is desirable.

Direct dyeing operations can, with advantage, be conducted at temperatures of about 75–85° C. but any suitable temperature may be used. Thus, the textile material to be dyed or colored is ordinarily added to the dyebath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1–3% by weight of dye to material is employed although any desired proportions can be used.

Suitable dispersing agents together with the amounts that may be employed are disclosed in our Patent No. 2,115,030, issued April 26, 1938. The process disclosed in this patent for the dyeing of cellulose acetate silk can be used in applying the dyes of the present application to this material.

It will be understood that the other textile materials named hereinbefore can be directly colored from an aqueous dyebath in a similar manner as cellulose acetate silk. However, other suitable methods for the dyeing of these materials are known to those skilled in the art and these methods, of course, can be used in applying the dye compounds of this application if desired. We would further note that, while colors yielded by the dye compounds have been given primarily with reference to cellulose acetate silk, generally similar colors are ordinarily obtained on the other materials.

We claim:

1. The azo compounds having the general formula

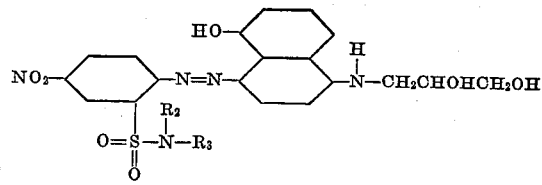

wherein $R_2$ and $R_3$ each represents a member selected from the group consisting of an alkyl group, a hydroxyalkyl group and an alkoxyalkyl group and $R_3$ may be in addition hydrogen.

2. The azo compounds having the formula:

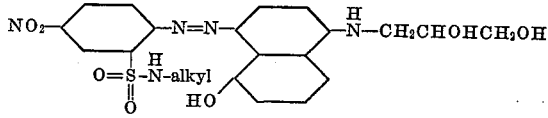

3. The azo compound having the formula:

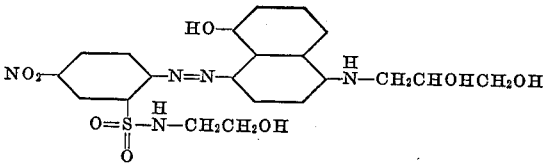

4. The azo dye having the formula:

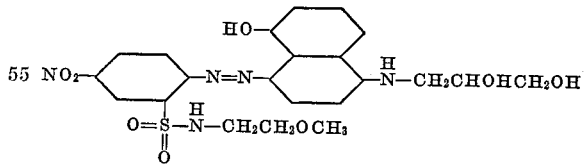

JAMES G. McNALLY.
JOSEPH B. DICKEY.